Patented Jan. 10, 1950

2,494,355

UNITED STATES PATENT OFFICE 2,494,355

SALTS OF AROMATIC DITHIOCARBOXYLIC ACIDS AS FUNGICIDES

Philip T. Paul, Naugatuck, and Joseph Bjorn Skaptason, Woodbridge, Conn., assignors to United States Rubber Company, New York, N. Y., a corporation of New Jersey No Drawing. Application November 1, 1944, Serial No. 561,492

6 Claims. (Cl. 167—30)

This invention relates to new and useful improvements in fungicides. The invention further relates to methods of protecting organic material subject to attack by microorganisms, as in the control of fungi on plants.

We have found that salts of aromatic dithio acids are effective fungicides. Salts of aromatic dithio acids and their preparation are known. For example, sodium dithiobenzoate may be prepared by the action of sodium sulfide on benzotrichloride. Another method of preparation of aromatic dithio acids involves the action of carbon disulfide on a Grignard reagent. Salts of 2-hydroxy-1-dithionaphthoic acid and their preparation are disclosed in U. S. patent to Hardman No. 2,289,649.

The salts of aromatic dithio acids may be used as seed protectants and to protect plants, which term includes plant parts, or soil from microorganisms harmful to seeds and plants. They may be applied as dusts, undiluted or mixed with a solid carrier, such as clay or talc, or as a spray in a liquid carrier, as in solution in a suitable solvent, or suspended in a suitable non-solvent, for example, water. They may be admixed with carriers that are active of themselves, for example, other fungicides or bactericides, insecticides, insectifuges, fertilizers, hormones, buffering or softening agents.

The following examples are given to illustrate the invention:

Example I

Aqueous suspensions containing 2000, 500, 125 and 32 parts per million (P. P. M.) of water of various salts of aromatic dithio acids were sprayed onto tomato plants and allowed to dry. The thus treated plants and some untreated (check) were then inoculated with a spore suspension of Alternaria solani, the causal organism of the early blight disease of tomato. Sixty hours later a count was made of the number of lesions which had developed on the plants. The check plants averaged 401 lesions per plant. The average number blight lesions per plant treated with the various concentrations of different salts of aromatic dithio acids are shown in the following table:

| Chemical | Blight Lesions per Plant | | | |
|---|---|---|---|---|
| | 2000 P. P. M. | 500 P. P. M. | 125 P. P. M. | 32 P. P. M. |
| Zinc-2-hydroxy-1-dithionaphthoate | 6 | 36 | 52 | 92 |
| Lead-2-hydroxy-1-dithionaphthoate | 17 | 32 | 49 | 151 |
| Disodium-2-hydroxy-1-dithionaphthoate | 23 | 23 | 164 | 179 |
| Basic cupric-2-hydroxy-1-dithionaphthoate | 28 | 126 | 168 | 225 |
| Basic ferric-2-hydroxy-1-dithionaphthoate | 49 | 77 | 81 | 122 |
| Cupric-2-hydroxy-1-dithionaphthoate | 55 | 141 | 179 | 217 |
| Ferric-2-hydroxy-1-dithionaphthoate | 61 | 135 | 146 | 294 |
| Zinc dithiobenzoate | 92 | 94 | 118 | 317 |
| Lead dithiobenzoate | 95 | 126 | 235 | 291 |

The above shows the effectiveness of salts of aromatic dithio acids as plant fungicides.

Example II

Slide tests were made with various salts of aromatic dithio acids on the fungi Alternaria solani and Sclerotinia americana according to the procedure outlined in Phytopathology, vol. 33, page 627 (1943). In these tests, aqueous suspensions of various concentrations of the different chemicals are mixed with a suspension of the particular fungus spores under observation and drops of the mixture are placed on glass slides to germinate. Observations are made after 20 hours to determine in each case the percentage kill of the spores. From doseage-response curves based on such observations, the concentration of chemical in parts per million of water, that is required to kill or inhibit the germination of 50% of the spores may be determined. This is called the LD 50 value (lethal doses for 50% effectiveness). The LD 50 values for various salts of aryl dithio acids in slide tests on Alternaria solani and Sclerotinia americana are shown in the following table:

| Chemical | LD 50 Values | |
|---|---|---|
| | Alternaria | Sclerotinia |
| | P. P. M. | P. P. M. |
| Lead-2-hydroxy-1-dithionaphthoate | 0.4 | 0.4 |
| Zinc-2-hydroxy-1-dithionaphthoate | 0.9 | 0.5 |
| Cupric-2-hydroxy-1-dithionaphthoate | 2 | 0.5 |
| Disodium-2-hydroxy-1-dithionaphthoate | 3 | 3 |
| Basic ferric-2-hydroxy-1-dithionaphthoate | 3 | 3 |
| Ferric-2-hydroxy-1-dithionaphthoate | 250 | 250 |
| Basic cupric-2-hydroxy-1-dithionaphthoate | 250 | 250 |
| Cupric-2-hydroxy-6-sulfo-1-dithionaphthoate | 20 | 20 |
| Lead dithiobenzoate | 9 | 8 |
| Zinc dithiobenzoate | 20 | 20 |
| Cupric-4-phenyl-dithiobenzoate | 20 | 20 |

Having thus described our invention, what we claim and desire to protect by Letters Patent is:

1. A fungicidal preparation comprising a powdered solid carrier and a salt of an aromatic dithiocarboxylic acid selected from the group consisting of 1-dithionaphthoic acids and dithiobenzoic acids.

2. A fungicidal preparation comprising a powdered solid carrier and a salt of dithiobenzoic acid.

3. A fungicidal preparation comprising a powdered solid carrier and a salt of 2-hydroxy-1-dithionaphthoic acid.

4. A fungicidal preparation comprising a powdered solid carrier and zinc-2-hydroxy-1-dithionaphthoate.

5. A fungicidal preparation comprising a powdered solid carrier and lead-2-hydroxy-1-dithionaphthoate.

6. A fungicidal preparation comprising a powdered solid carrier and lead dithiobenzoate.

PHILIP T. PAUL.
JOSEPH BJORN SKAPTASON.

REFERENCES CITED

The following references are of record in the file of this patent:

UNITED STATES PATENTS

| Number | Name | Date |
|---|---|---|
| 1,648,259 | Cadwell | Nov. 8, 1927 |
| 2,289,649 | Hardman | July 14, 1942 |
| 2,317,765 | Hester | Apr. 27, 1943 |
| 2,352,079 | Coleman et al. | June 20, 1944 |

OTHER REFERENCES

Jour. Economic Entomology, vol. 27 (1934), pages 1178, 1180, 1181, 1182 by Campbell et al.